(12) United States Patent
Chiu et al.

(10) Patent No.: US 7,975,082 B2
(45) Date of Patent: Jul. 5, 2011

(54) SYSTEM AND METHOD TO FACILITATE DETERMINISTIC TESTING OF DATA TRANSFERS BETWEEN INDEPENDENT CLOCK DOMAINS ON A CHIP

(75) Inventors: Frank C. Chiu, Santa Clara, CA (US); Ian Jones, Santa Clara, CA (US); Anup Pradhan, Santa Clara, CA (US); Iain Robertson, Bedfordshire (GB)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/478,696

(22) Filed: Jun. 4, 2009

(65) Prior Publication Data

US 2009/0240969 A1   Sep. 24, 2009

Related U.S. Application Data

(63) Continuation-in-part of application No. 11/777,246, filed on Jul. 12, 2007.

(51) Int. Cl.
G06F 3/00 (2006.01)
G06F 5/00 (2006.01)

(52) U.S. Cl. .................................. 710/52; 712/32
(58) Field of Classification Search .................. None
See application file for complete search history.

(56) References Cited

U.S. PATENT DOCUMENTS

| | | | | |
|---|---|---|---|---|
| 4,710,922 A * | 12/1987 | Scott | ............................. | 370/535 |
| 5,040,190 A * | 8/1991 | Smith et al. | .................. | 375/214 |
| 5,420,893 A * | 5/1995 | Ward | ............................. | 375/368 |
| 5,655,113 A * | 8/1997 | Leung et al. | .................. | 713/401 |
| 5,796,392 A * | 8/1998 | Eglit | ............................. | 345/213 |
| 5,834,980 A * | 11/1998 | Pitio et al. | ......................... | 331/2 |
| 5,949,262 A * | 9/1999 | Dreps et al. | .................... | 327/156 |
| 6,033,441 A * | 3/2000 | Herbert | ......................... | 713/375 |
| 7,016,447 B1 * | 3/2006 | Reuveni | ......................... | 375/371 |
| 2002/0061016 A1 * | 5/2002 | Mullaney et al. | .............. | 370/384 |
| 2005/0286507 A1 * | 12/2005 | sterling et al. | ................ | 370/363 |
| 2006/0195631 A1 * | 8/2006 | Rajamani | ......................... | 710/51 |
| 2007/0002989 A1 * | 1/2007 | Song | ............................. | 375/355 |
| 2007/0103204 A1 * | 5/2007 | Egan et al. | ..................... | 327/100 |
| 2007/0177701 A1 * | 8/2007 | Thanigasalam | ............... | 375/372 |
| 2007/0230509 A1 * | 10/2007 | To et al. | ......................... | 370/503 |

* cited by examiner

*Primary Examiner* — Henry W Tsai
*Assistant Examiner* — Michael Sun
(74) *Attorney, Agent, or Firm* — Martine Penilla & Gencarella, LLP

(57) ABSTRACT

A system and method of deterministically transferring data across a first clock domain to a second clock domain includes receiving a resynchronize command, initiating a corresponding one of a plurality of read delays in each one of a second plurality of devices in the second clock domain, counting down the plurality of read delays to zero, receiving a training pattern after the plurality of read delays count down to zero in each one of the second plurality of devices, recovering a clock data in each of the second plurality of devices, receiving a synch byte by each of the second plurality of devices, selecting one of a plurality of serial lanes as a reference lane, wherein the plurality of serial lanes couple the first clock domain to the second clock domain, initiating a write pointer, writing n bytes of serial data to a buffer and converting the n bytes of data from serial data to parallel data in a serial to parallel converter such that the serial n byte data in the buffer are aligned in time.

16 Claims, 11 Drawing Sheets

| | TRAINING BYTE 0 | TRAINING BYTE 1 | SYNCH BYTE | DATA BYTE 0 | DATA BYTES 1 TO N-1 | DATA BYTE N |
|---|---|---|---|---|---|---|
| LANE 0 | 1 0 1 0 0 0 0 0 | 1 0 1 0 0 0 0 0 | 1 1 1 1 1 1 1 0 | A A A A A A A A | | D D D D D D D D |
| LANE 1 | 1 0 1 0 0 0 0 0 | 1 0 1 0 0 0 0 0 | 1 1 1 1 1 1 1 0 | B B B B B B B B | • • • | E E E E E E E E |
| LANE 2 | 1 0 1 0 0 0 0 0 | 1 0 1 0 0 0 0 0 | 1 1 1 1 1 1 1 0 | C C C C C C C C | | F F F F F F F F |

SYSTEM AND METHOD TO FACILITATE DETERMINISTIC TESTING OF DATA TRANSFERS BETWEEN INDEPENDENT CLOCK DOMAINS ON A CHIP

CROSS-REFERENCE TO RELATED APPLICATIONS

This application is a continuation-in-part of and claims priority from U.S. patent application Ser. No. 11/777,246 filed on Jul. 12, 2007 and entitled "System and Method to Facilitate Deterministic Testing of Data Transfers between Independent Clock Domains on a Chip," which is incorporated herein by reference in its entirety. This application is related to co-owned and co-pending U.S. patent application Ser. No. 11/744,052, filed on May 3, 2007 and entitled "Deterministic Test Strand Unparking", which is incorporated herein in its entirety for all purposes.

BACKGROUND

The present invention relates generally to input and output data transmission, and more particularly, to methods and systems for deterministically transferring data between a processor core clock domain and an input/output clock domain.

Automatic test equipment (ATE) usage is a very important tool for validating semiconductor circuit designs, circuit debug, and testing instruction set based functionality of processors. The current generation of ATE typically require cycle accuracy of data vectors and related determinism of device output signals to strobe for comparison with expected data.

Speed or timing dependent semiconductor defects can be determined using structural delay tests. Unfortunately, there are shortfalls in structural tests with reference to memory accesses and other logic circuits. Such an approach may not cover paths exercised by actual applications without significant engineering efforts. Therefore, it is widely accepted that processors used in mission critical applications are required to be validated and debugged by emulating their natural instruction set. This methodology of functional testing need not apply to manufacturing tests but has been known to exhibit value add during core frequency based screening of processors.

As the processor speeds increase, the speed on the input/output of the processors is similarly increased. As a result, the typical ATE cannot test the I/O interface of such a fast processor to the limits of the designed performance of the I/O interface. Further, with the existence of widely varying core clock and I/O clock frequencies, processor design can be simplified by allowing the different clock domains to operate asynchronously. However, this further complicates functional testing of vectors because it introduces indeterminism around the clock crossing.

Further, the processors have core cycle speeds of greater than 2 GHz. Unfortunately, the ATE may not be able to input or output data to or from the processors at such high processor core speeds. What is needed is a system and method for accurately transferring data to and from the ATE to test the performance limits of the I/O and the processor core.

SUMMARY

Broadly speaking, the present invention fills these needs by providing a system and method for deterministically transferring data across different clock domains having corresponding different clock cycle rates in a cycle accurate behavior. It should be appreciated that the present invention can be implemented in numerous ways, including as a process, an apparatus, a system, computer readable media, or a device. Several inventive embodiments of the present invention are described below.

One embodiment provides a method of deterministically transferring data across a first clock domain to a second clock domain includes receiving a resynchronize command, initiating a corresponding one of a plurality of read delays in each one of a second plurality of devices in the second clock domain, counting down the plurality of read delays to zero, receiving a training pattern after the plurality of read delays count down to zero in each one of the second plurality of devices, recovering a clock data in each of the second plurality of devices, receiving a synch byte by each of the second plurality of devices, selecting one of a plurality of serial lanes as a reference lane, wherein the plurality of serial lanes couple the first clock domain to the second clock domain, initiating a write pointer, writing n bytes of serial data to a buffer and converting the n bytes of data from serial data to parallel data in a serial to parallel converter such that the serial n byte data in the buffer are aligned in time.

The resynchronize command can be initiated by source within a CPU that includes at least one of the first clock domain and the second clock domain. The resynchronize command can be initiated by an arbitrary counter within a CPU that includes at least one of the first clock domain and the second clock domain. The resynchronize command can be an automatic periodic event. The resynchronize command can be issued every selected number of cycles of a reference signal.

A duration of one of the read delays can correspond to a distance between the corresponding device and a CPU core including the second plurality of devices. A duration of one of the read delays can correspond to an actual delay in a data received from a transmitting device. A duration of one of the read delays can be a first selected number of cycles between when the resynchronize command is received in each receiving device and when the data bit is received in a slowest lane. A duration of one of the read delays can be limited to not more than a second selected number of cycles after the resynchronize command is received in each receiving device.

Each one of the training bytes in the training pattern can include a corresponding pre-selected value. Each one of the pre-selected values can have the same or different pre-selected value. The synch byte can include a corresponding pre-selected value.

Recovering the clock data in each of the second plurality of devices can include locking a PLL circuit corresponding to a selected receiver circuit to the corresponding transmitter's PLL circuit.

Another embodiment provides a system for deterministically transferring data across from a first clock domain to a second clock domain. The system includes a computer including computer readable code on a computer readable media for receiving a resynchronize command wherein the resynchronize command is an automatic periodic event and for initiating a corresponding one of a plurality of read delays in each one of a second plurality of devices in the second clock domain. The computer also includes computer readable code on a computer readable media for counting down the plurality of read delays to zero and for, receiving a training pattern after the plurality of read delays count down to zero in each one of the second plurality of devices, wherein each one of a plurality of training bytes in the training pattern includes a corresponding one of a plurality of pre-selected values. The computer also includes computer readable code on a computer readable media for recovering a clock data in each of the second plurality of devices including locking a PLL circuit corresponding to a selected receiver circuit to the corresponding transmitter's PLL circuit and for receiving a synch byte in each of the second plurality of devices wherein the synch byte includes a corresponding pre-selected value. The computer also includes computer readable code on a computer readable media for selecting one of a plurality of serial lanes as a reference lane, wherein the plurality of serial lanes couple the first clock domain to a second clock domain. The computer also includes computer readable code on a computer readable media for initiating a write pointer and for writing n bytes of serial data to a buffer and for converting the n bytes of data from serial data to parallel data in a serial to parallel converter such that the serial n byte data in the buffer are aligned in time.

Yet another embodiment provides a microprocessor simulation in an automated test bench. The simulation includes a first clock domain and a second clock domain. The first clock domain including a first plurality of logic devices for communicating a read status from the first clock domain to the second clock domain. The simulation also includes logic for receiving a resynchronize command, logic for initiating a corresponding one of a plurality of read delays in each one of a second plurality of logic devices in the second clock domain and logic for counting down the plurality of read delays to zero. The system also includes logic for receiving a training pattern after plurality of read delays count down to zero in each one of the second plurality of logic devices, logic for recovering a clock data in each of the second plurality of logic devices and logic for receiving a synch byte in each of the second plurality of logic devices. The system also includes logic for selecting one of a plurality of serial lanes as a reference lane, wherein the plurality of serial lanes couple the first clock domain to a second clock domain. The system also includes logic for initiating a write pointer, logic for writing n bytes of serial data to a buffer and logic for converting the n bytes of data from serial data to parallel data in a serial to parallel converter such that the serial n byte data in the buffer are aligned in time.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 4 illustrates the training pattern, in accordance with one embodiment of the present invention.

DETAILED DESCRIPTION

Figure 1:
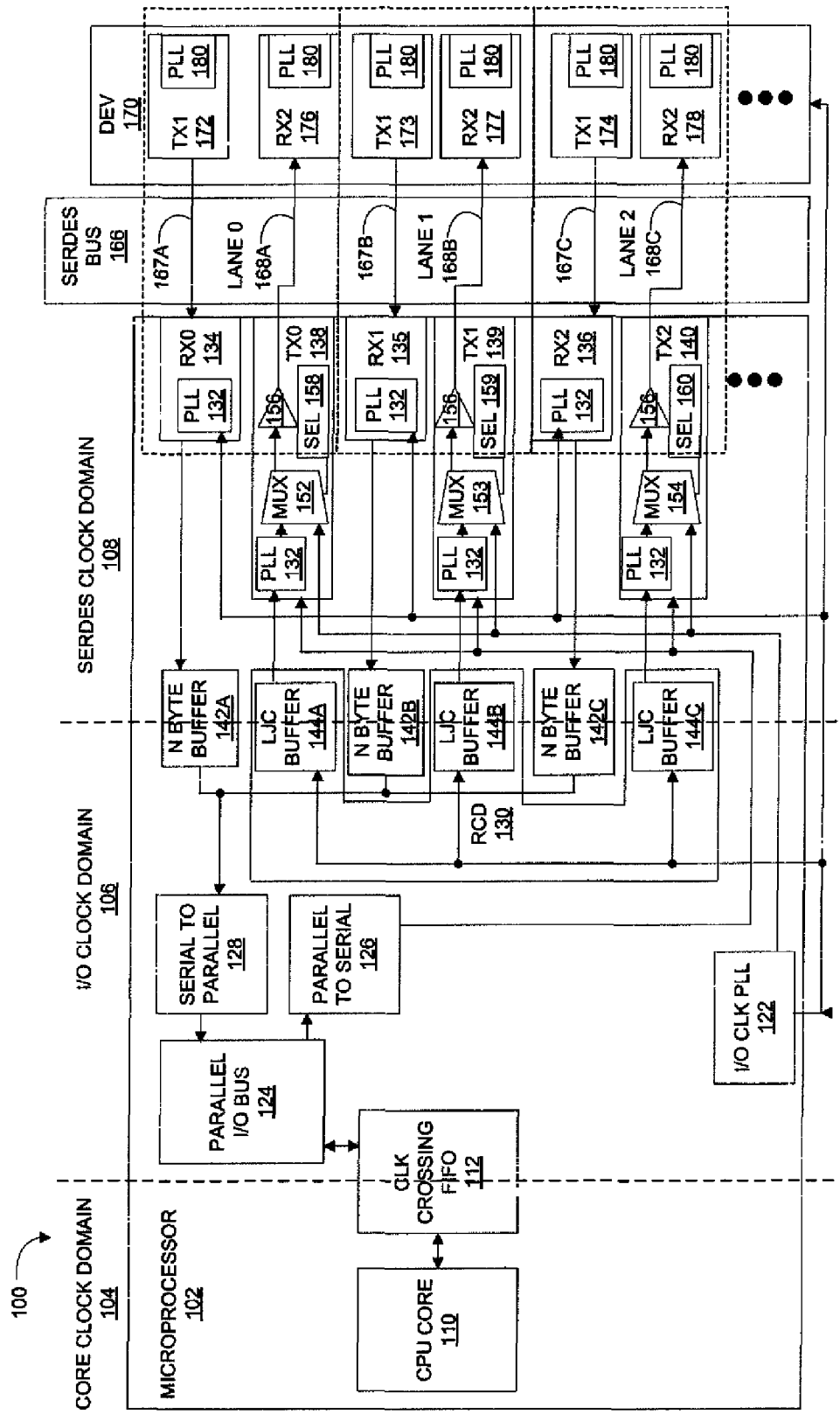
FIG. 1 is a block diagram of a processor system, in accordance with an embodiment of the present invention.

Several exemplary embodiments for a system and a method for deterministically transferring data across different clock domains having corresponding different clock cycle rates will now be described. It will be apparent to those skilled in the art that the present invention may be practiced without some or all of the specific details set forth herein.

As described above, many current processors often include two or more independent clock domains (e.g., I/O and core clock domains). Typical ATE lacks the capabilities required to fully test such processors. By way of example, typical ATE cannot operate as fast as even the lowest frequency clock domain of the processor (i.e., the core clock domain). Further, ATE typically requires cycle accurate data vectors during the tests, thus demanding deterministic behavior of the processor, not just in the sequence of events that occur, but also in which particular tester clock cycle all the events occur.

During normal operation, data transfers between the various independent clock domains on the processor, need not follow a deterministic sequence. Even when the sequence of data transactions is deterministic, very often these transactions will not take place at deterministically specific clock cycles. Instead, the data transfers will occur within a range of a few clock cycles. This non-determinism when transferring data between independent clock domains is fundamental and is a result of using independent clocks. Careful circuit design can reduce the range of clock cycles in which a particular transaction occurs, but cannot make the task deterministic. Cycle accurate deterministic operation can be achieved when all the on-chip clocks are derived from a single tester clock.

The system and method presented herein describes a processor that has multiple independent clocks. Cycle accurate deterministic operation during testing is achieved by altering the frequencies of each of the clock domains on the processor to be integer multiples of a single reference clock generated by the tester. Alternatively, the systems and method provides a test environment that more closely matches the normal operational environment. The frequencies of these on-chip clocks could be rational multiples of the tester clock (i.e., a multiple of n/m, where n and m are both integers). Additional circuits at the clock domain crossings can also be included to facilitate the two modes of operation (i.e., normal and test modes). The additional circuits at the clock domain crossings can also provide the required deterministic operation when in test mode.

The invention described herein enables performance limit testing of the individual clock domains using two modes. The first mode selects a CPU_CLK to IO_CLK frequency ratio of 1:1 to stress the circuits in the IO_CLK domain. The second mode selects a CPU_CLK to IO_CLK frequency ratio of 2:1 to stress the circuits in the CPU_CLK domain. The system and method enables testing of the chip beyond the first clock domain crossing.

Furthermore, cycle accurate deterministic operation is achieved, thus enabling more extensive testing with fewer test vectors. By way of example, if the processor operation was only sequence accurate, with a range of cycles in which an event would occur, then many more test vectors are required to verify that the processor is functioning correctly. Thus, testing of sequence accurate operation results increased total test time, and greater potential to falsely flag operation as "bad" because the particular cycle in which an event occurred was omitted from the range of test vectors. The invention described herein achieves more extensive testing than would otherwise be possible, while using a minimum number of test vectors.

Many faster processors use high speed serial interfaces such as a SERDES (serialized/deserialized) interface. SERDES interfaces have been used in application specific integrated circuits (ASICs). Unfortunately, a SERDES interface does not provide a certainty when delivering data across the SERDES data bus.

One embodiment provides a SERDES interface included in a processor design in order to support high-speed input/output (I/O) bandwidth requirements. In an independently clocked I/O environment, such as SERDES, the observability at the I/O pins is transaction or event based, often with a loss of traditional cycle accuracy. Therefore, the SERDES interface breaks the existing ATE envelope, as cycle accuracy and determinism within a selected time window is not possible. Further, the SERDES can be designed to operate at about 1.33 GHz or even faster, which is a speed faster than the typical ATE is capable of providing. The SERDES bus reduces the number of data I/O pins required for the microprocessor and therefore reduces the number of devices and the conductive traces and corresponding structures in the microprocessor die. Reducing the number of number of devices and the conductive traces and corresponding structures in the microprocessor die allows a simpler design in the microprocessor die and allows more flexibility in the design (e.g., placement, routing, etc.) of the devices, conductive traces and corresponding structures in the microprocessor die.

In a receive mode the non-determinism due to high frequency jitter related to driving capabilities and supported data rates of typical ATE can be avoided by operating the SERDES interconnect at half or a lower data rate (with all clocks maintained at rated speed); thus increasing tolerance to jitter. Another part of the solution utilizes the fact that the lane-to-lane deskew aligns all lanes to a selected point in time. The selected point in time can be set to the slowest lane to minimize latency. This can be deterministically controlled by predefining one or two worst case lane delays by design, internal or external to the device.

The receiver FIFO read pointer alignment, plus the lane to lane deskew could also be addressed by supporting an internally programmable common delay value to which the read pointer for all lanes within a link are synchronized and in addition, ensure that overflow or underflow is avoided.

Similar determinism issues arise when transferring data from an I/O domain at a first clock rate to a processor core domain at a significantly different clock rate. By way of example the processor core domain can have a clock rate of 2.67 GHz or more where the I/O domain has a clock rate of only about 1.0 GHz. One approach is to slow the processor core clock rate to the same 1.0 GHz clock rate of the I/O domain during the testing phase in the ATE. However, such testing does not accurately test all capabilities of the processor design.

Functional semiconductor class test vectors generated from a full-chip RTL simulation environment and utilized on ATE are expected to be cycle accurate for device input signals driven by the ATE, and device output signals strobed by the ATE comparators. Restated, the ATE expects each I/O pin signal to be deterministic in time. These interconnects are also synchronous to relevant reference clocks. This cycle accurate synchronous arrangement changes significantly with a SERDES interface (e.g., PCI-Express (PCIe), X Attachment Unit Interface (XAUI) or similar 10 Gbit ethernet or fully buffered dual in-line memory module (FBDIMM)). The essence of such SERDES interfaces is to support a high bandwidth Gbps interconnect, facilitated by an independent clock and protocol.

ATE usage is a very important stage of semiconductor validation, circuit debug, and test of the instruction set based functionality of microprocessors. Typical ATE have a traditional requirement of cycle accuracy of vectors and related determinism of device output signals to strobe for comparison with expected data.

Functional (or instruction set based) semiconductor class test vectors generated from a full-chip RTL simulation environment are utilized at various phases of a product cycle. The phases include validation, circuit debug, characterization, production, and failure analysis. The goal is to debug timing related circuit issues, identify speed dependent semiconductor design or production defects, and emulate a system operating environment for processor logic validation and failure analysis.

Some of the speed or timing dependent semiconductor defects can be determined using structural delay tests. A structural test divides the circuit design into segments or sections and each section is tested in the ATE. The results of the section test are then combined to provide an estimation of the entire circuit operation.

There are significant shortfalls of a structural test with reference to memory accesses. Further, structure tests may not fully exercise data paths exercised by actual applications without significant, additional engineering efforts. Therefore, it is widely accepted that microprocessors used in mission critical applications need to be validated and debugged by emulating their natural instruction set. This methodology of functional testing may not apply to manufacturing tests but has been known to exhibit value add during processor core frequency based screening of processors. For this application in an independently clocked I/O environment, the observability at the I/O pins is transaction or event based, with the loss of traditional cycle accuracy.

Functional semiconductor class test vectors generated from a full-chip RTL simulation environment and utilized on an ATE are expected to be cycle accurate for device input signals driven by the ATE, and device output signals strobed by the ATE comparators. Restated, each IO pin signal is deterministic in time. These interconnects are also synchronous to relevant reference clocks. This cycle accurate synchronous arrangement changes significantly with a high speed serial independently clocked (SERDES) interface like PCIe, XAUI or FBDIMM. The very essence of such SERDES interfaces is to support a high bandwidth Gbps interconnect, facilitated by an independent clock and protocol.

FIG. 1 is a block diagram of a processor system 100, in accordance with an embodiment of the present invention. The processor system 100 includes a microprocessor 102, a SERDES bus 166 and an external device 170. The SERDES bus 166 includes multiple lanes: Lane0, Lane1 and Lane3. The SERDES bus 166 can include additional lanes that are not shown in detail. The external device 170 can be an ATE or any other device in communication with the microprocessor 102.

The microprocessor 102 includes three domains: a core clock domain 104, an I/O clock domain 106 and a SERDES clock domain 108. Each of the domains 104, 106, 108 represents a region where the clock has either the same frequency but different phase, or an entirely different frequency. By way of example, the core clock domain 104 includes a CPU core 110 and has a clock speed equal to the processing speed of the CPU core. The I/O clock domain 106 includes a parallel I/O bus 124, an I/O clock phase-locked-loop (PLL) circuit 122 and any devices and subsystems coupled to the I/O bus and operating at the speed of the I/O clock. The SERDES clock domain 108 includes the devices 130-160 for transferring data from the I/O clock domain 106 to the SERDES bus 166.

The I/O clock PLL 122 has reference clock input 114 for receiving a reference signal that the I/O clock PLL uses to generate the I/O clock. The I/O clock is distributed about the I/O clock domain 106 and the SERDES clock domain 108. The I/O clock domain 106 also includes a serial to parallel converter 128 and a parallel to serial converter 126. The parallel to serial converter 126 converts parallel data from the parallel I/O bus 124 into serial data for the SERDES bus 166. The serial to parallel converter 128 converts serial data from the SERDES bus 166 into parallel data for the parallel I/O bus 124.

The I/O clock domain 106 also includes a clock crossing first in first out circuit (FIFO) 112. The clock crossing FIFO 112 transfers data between the core clock domain 104 and the I/O clock domain 106.

The I/O clock domain 106 also includes a set of buffers 142A-C. Each of the buffers 142A-C has a size capable of holding a selected number (n) bytes.

The SERDES clock domain 108 includes multiple receive modules 134-136 and multiple transmit modules 138-140. Each of the receive modules 134-136 and the transmit modules 138-140 include a local PLL circuit 132. The local PLL circuits 132 receive a reference signal from a reference clock distribution 130. The reference clock distribution 130 isolates the I/O clock signal from the local PLL circuits 132. As shown, each of the local PLL circuits 132 are coupled to a single data line. It should be understood that the receive modules 134-136 are limited to a single data line, however the transmit modules 138-140 can be coupled to multiple (e.g., 2-16) data lines.

The SERDES bus 166 includes multiple lanes, Lane0, Lane1 and Lane2. Each of the Lane0, Lane1 and Lane2 includes at least two data lanes: a transmit line 168A-C for outgoing data and a receive line 167A-C for incoming data. Each data line 167A-C, 168A-C includes a transmit module on an outgoing end and a receiver module on a receiving end. By way of example, the Lane0 includes data lines 167A and 168A. The outgoing data line 168A couples transmitter module 138 in the microprocessor 102 to a receiver 176 in the device 170. The receiving data line 167A couples transmitter module 172 in the device 170 to a receiver 134 in the microprocessor 102.

SERDES bus 166 can be generically described as high data rate point-to-point, serial, differential interface. In operation, the transmitter module outputs data at a clock rate determined by the local PLL in the transmitter module. The local PLL in the corresponding receiver module locks to the local PLL in the transmitter module. By way of example, when transmitting data out of the microprocessor 102 on data line 168A, the local PLL 132 in the transmitter module 138 creates a first clock signal local to the outgoing data lines from the transmitter module. The local PLL 180 in the corresponding receiver module 176 locks to the first clock signal. Locking the local PLL 180 in the corresponding receiver module 176 to the first clock signal is referred to as receiver clock recovery. The local PLLs 132 and 180 therefore maintain a locked clock on the data line 168A. Receiver clock recovery minimizes or substantially eliminates the jitter on each of the data lines 167A-168C.

The timing of the data output across a SERDES lane is controlled by the corresponding mux 152, 153, 154. By way of example, in a test mode, the muxes 152, 153, 154 select the IOCLK output of I/O CLK PLL 122, which is skew controlled across all the SERDES lanes. In a normal data mode, the muxes 152, 153, 154 select the local clock on that SERDES lane that generated from the local PLL 132. The local PLLa 132 can have different, corresponding offset clock signals relative to each other due to the relative offset on the reference clock distribution 130. The different, corresponding offsets are controlled to minimize jitter.

Figure 2:
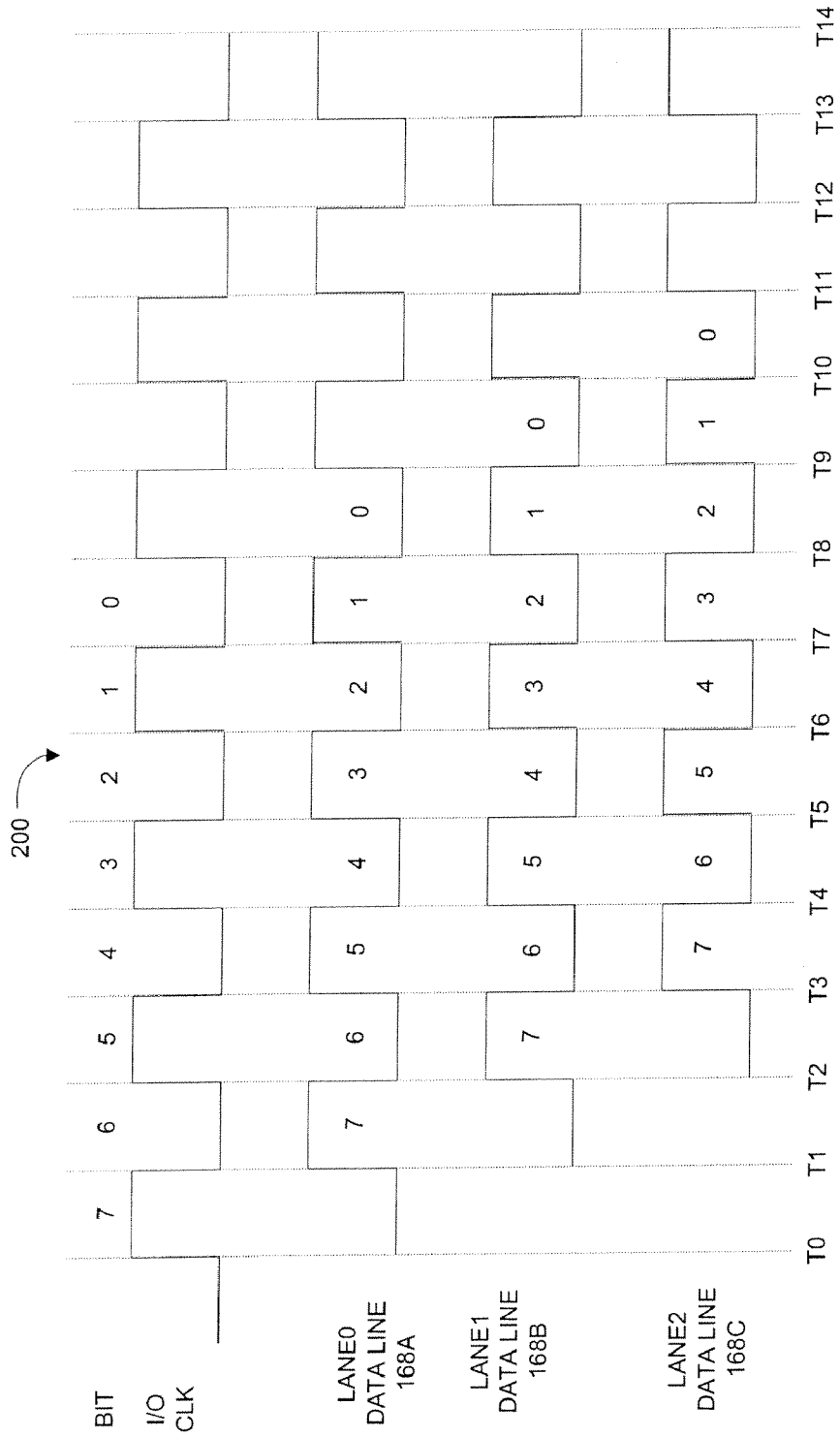
FIG. 2 is a timing diagram of the Lane0-Lane2, in accordance with an embodiment of the present invention.

FIG. 2 is a timing diagram 200 of the Lane0-Lane2, in accordance with an embodiment of the present invention. Unfortunately, because each of the data lines 167A-168C has a related but not the same clock, the variation in clock (i.e., skew) between any two data lines (e.g., data lines 168B and 168C) can result in data non-determinism. By way of example and referring now to FIG. 2, if bit 7 is transmitted at time T0 (relative to the I/O clock), bit 7 could be delayed to time T2 on data line 168B and time T3 on data line 168C. It should be understood that while the skew between Lane0, Lane1 and Lane2 is shown as being precisely one half clock cycle (i.e., 180 degrees), it should be understood that the skew can be less than or more than a 180 degrees (e.g., 0-360 degrees, greater than 360 degrees, etc.). As a result, bit 7 may arrive at the device 170 on lane1 before bit 7 arrives in the device 170 on lane2. As a result, neither the microprocessor 102 nor the device 170 (e.g., ATE) can accurately predict when a particular data bit will be received at the opposite end of the SERDES bus 166. Similarly, if the device 170 is an ATE, then the ATE cannot accurately predict or determine when a bit that is sent to the microprocessor 102 will be received by the microprocessor, nor can the ATE predict when a response to the bit will be sent from the microprocessor or received back by the ATE. As a result, this lack of determinism makes a SERDES interface very difficult to communicate with and especially to perform microprocessor testing.

Yet another source of data non-determinism arises in the FIFOs and/or buffers commonly used to transfer data between independent clock domains within the receiver and transmitter paths for I/Os. By way of example, a recovered clock used for receiver data sampling may not be at an ideal point, midway within a clock cycle. The phase could be offset such that the data is sampled in the wrong half of the clock. The buffer used for bit alignment of received data maintains a deterministic phase relationship between the read and write pointers, to avoid overflow or underflow. The write pointer is based on the recovered clock, while the read pointer is based on the local clock.

Figure 3:
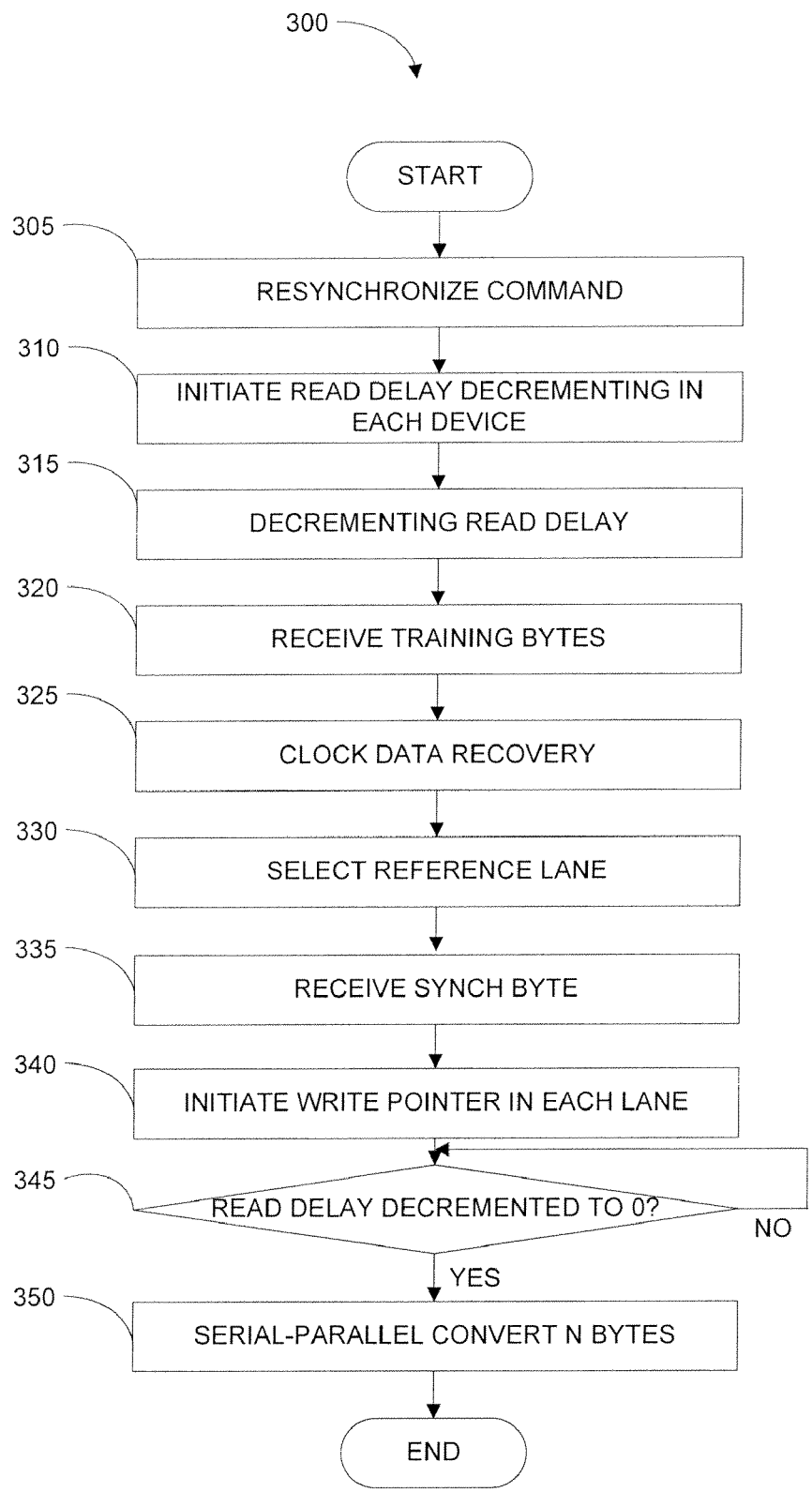
FIG. 3 is a flowchart diagram that illustrates the method operations 300 performed in receiving data across the SERDES bus, in accordance with one embodiment of the present invention.

FIG. 3 is a flowchart diagram that illustrates a method of operations 300 for receiving data across the SERDES bus 166, in accordance with one embodiment of the present invention. In an operation 305, a resynchronize command is received. The resynchronize command can be initiated by an arbitrary counter another source within the microprocessor 102 or external from the microprocessor. The resynchronize command can also be an automatic periodic event. The resynchronize command can be issued every selected number of cycles of a relatively lower frequency signal. By way of example, the resynchronize command can be issued every tenth or hundredth cycle of an about 40 MHz signal. The relatively longer cycle time allows the SERDES bus 166 to pass several bits before being resynchronized.

In an operation 310, a read delay decrementing is initiated in each device (device 170, microprocessor 102) coupled to the SERDES bus 166. A different read delay can be selected for each device so that the timing of the read delay can account for any delays due to differences in routing. By way of example, several devices can be coupled to the SERDES bus 166. Each of the several devices may be a different distance (i.e., time delay) from, for example, the microprocessor 102.

In an operation 315, as the read delay counts down (i.e., decrements) to zero (0) then a training pattern is sent from a source (e.g., the microprocessor 102) and the training bytes are received in each device in an operation 320. The read delay provides a delay in each device so that the training bytes are fully received in each device. This training pattern allows each receiving device to quantify the corresponding actual delay in the data received from the transmitting device. The transmitter and receiver devices have a common reference clock. Based on this reference clock, a resynchronize command is received. The transmitted training sequence is aligned to at the receiver end. Based on the resynchronize event reference, the receiver can measure the number of core clock cycles or delay required to recognize valid training data patter. The read delay can be a number of cycles between when the resynchronize command is received in each receiving device and when the data bit is received in the slowest lane (e.g., last received lane) in the SERDES bus 166.

The read delay can be any number of clock cycles sufficiently large enough to allow the slowest lane to receive the data. The read delay can be limited to a maximum number of clock cycles that the receiving device can buffer the received data. By way of example, if the received devices have a buffer of 64 bits, then the read delay must be not more than the number of cycles that will allow the fastest lane in the SERDES bus 166 to deliver more than 64 bits of data before the slowest lane receives the first data bit. It should be understood that a 64 bit receive buffer size is simply an exemplary value and that the receiver buffer can have any desired capacity.

FIG. 4 illustrates the training pattern 400, in accordance with one embodiment of the present invention. The training pattern includes two training bytes (e.g., byte0, byte1) followed by a synch byte, followed by N data bytes. The training bytes are received in an operation 320. The synch byte is received in an operation 335. The two training bytes and the synch byte each have pre-selected values. The pre-selected values can be the same or different. In one embodiment, the training bytes have the same value and the synch byte has a substantially different value than the training bytes. The values of the training bytes and the synch byte can be the same on every lane in the SERDES bus 166. Alternatively, the values of the training bytes and the synch byte can be unique to one or more lanes in the SERDES bus 166.

The data bytes can have whatever data value needed to be distributed on the SERDES bus 166. The values of the data bytes can be the same or different on every lane in the SERDES bus 166. The data bytes represent actual payload data to be transmitted across the SERDES bus.

In an operation 325, the clock data is recovered in each of the receivers that received the training bytes. The clock data is recovered by locking the corresponding receiver's PLL circuit to the corresponding transmitter's PLL circuit.

In an operation 330, one of the lanes (e.g., Lane0, Lane1, Lane2) is selected as a reference lane. Referring again to FIG. 2 above, Lane0 can be selected as the reference lane. In operation 335, the synch byte is received.

In an operation 340, a write pointer is initiated and the n bytes of data are written to a buffer (e.g., a n byte buffer 142A) in an operation 345. Once the read delay decrements to 0, all lanes should have initiated their respective write pointers and written n-bytes of data (where n varies according to each respective lane's specific delay), the operations continue in an operation 350.

In operation 350, the n bytes of data are converted from serial data to parallel data in the serial to parallel converter 128. The serial data in the n byte buffers 142A-C are aligned in time so that conversion process converts the correct data bits at the correct time.

By way of example and referring to FIGS. 1 and 2, the device 170 can send the training pattern 400 to the microprocessor 102 across the SERDES bus 166. If Lane0 is selected as the reference lane, and Lane1 lags Lane0 by 180 degrees (one half clock cycle) and Lane2 lags Lane0 by 360 degrees (one full clock cycle), then the data received on lane1 is delayed for one half clock cycle and the data received on lane2 is delayed for one full clock cycle in the corresponding n byte buffer 142B-C.

The reference clock distribution allows the microprocessor 102 and the ATE to operate in a synchronous mode such as may be desired for test purposes. The bit clock can be sourced from the bus clock for this purpose. The implementation can maintain jitter and skew budgets required for operational mode as described above. The phase relationship between the bus clock and the bit clock used to synchronize the write and read buffer pointers, as a part of the parallel to serial conversion of transmit data leads to a certain level of non-determinism.

Figure 5:
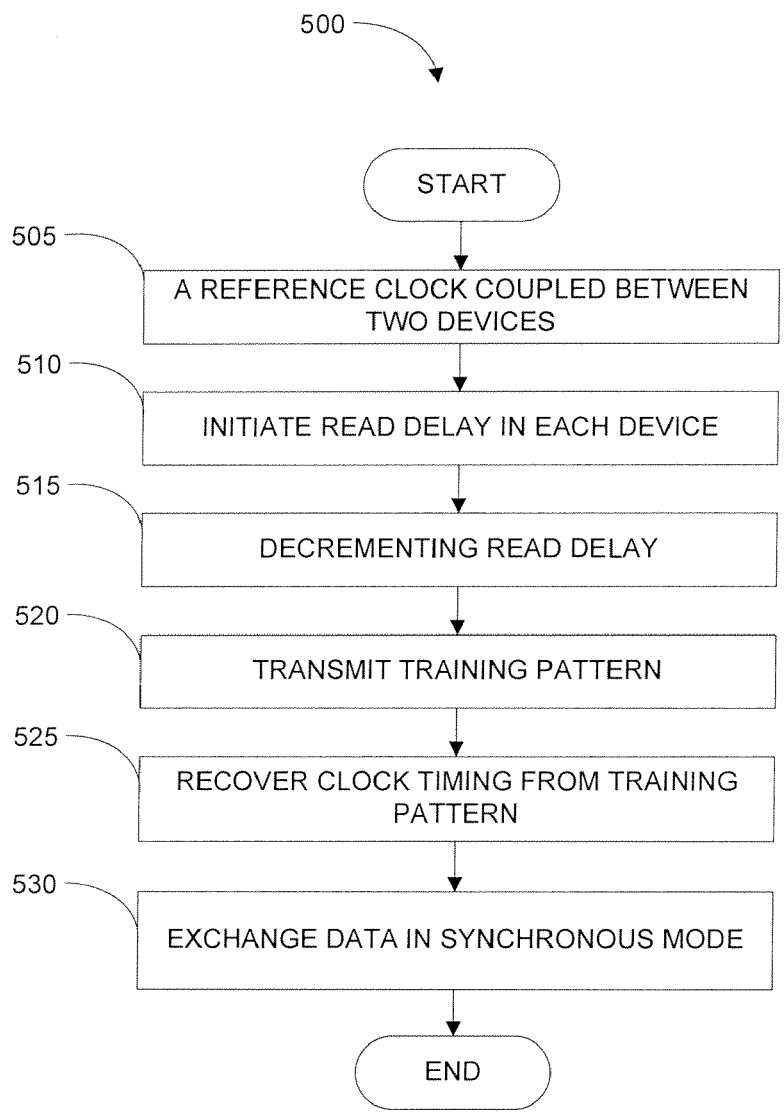
FIG. 5 is a flowchart of the method operations for testing the synchronous functionality of the microprocessor and the ATE, in accordance with an embodiment of the invention.

FIG. 5 is a flowchart of the method of operations 500 for testing the synchronous functionality of the microprocessor 102 and the ATE, in accordance with an embodiment of the invention. If the device 170 is an ATE or other device synchronous operation is desired, then the ATE can have a reference clock output 182. In an operation 505 and referring to FIG. 1, the reference clock output 182 is coupled to the reference clock input 114 on the microprocessor 102. Coupling the reference clock output 182 to the reference clock input 114 causes the I/O clock to synchronize to the ATE reference clock. This allows the ATE to synchronize with the microprocessor. This can aid in providing more determinism in the data exchanged between the ATE and the microprocessor 102.

In an operation 510, a read delay is initiated in ATE and the microprocessor In an operation 515, as the read delay counts down to zero (0) then a training pattern is sent from the microprocessor 102 including the training bytes byte0, byte1 are received in ATE in an operation 520.

The training bytes byte0, byte1, are received in an operation 525 and the clock data (e.g., timing) is recovered in the ATE as described in more detail above. In an operation 530, the data can be exchanged between the microprocessor 102 and the ATE.

The ATE can support the SERDES point-to-point receive/transmit interconnect and also the link training sequence described above. For this purpose it could be useful to have a test access mode to the configuration registers programmed during link training, in order to statically predefine their values for a controlled test application, and optimize the link training sequence. The vector format utilized for core functional testing can represent the data packet applicable to the specific protocol, driven by the ATE for the device under test receive, and driven by the device under test transmit to the ATE for capture and data payload analysis.

The forced synchronous nature of clock domain crossings described herein may entail clock ratio restrictions across applicable clock domains. To achieve the intended goal multiple iterations may be required to target at-speed functional coverage in each clock domain.

Passing data or data pointers from one clock domain to another clock domain can be made synchronous while in a test mode by synchronizing the respective clocks at a single clock rate or a precise clock ratio. By way of example, the core clock domain 104 and the I/O clock domain 106 can the set to a single clock rate (e.g., 100 MHz). In another example, the clock domain 104 and the I/O clock domain 106 can the set to a ratio of clock rates (e.g., a 4:1 ratio where the I/O clock domain has a clock cycle rate of 100 MHz and the core clock domain has a clock cycle rate of 400 MHz and a data bit is transferred ever fourth core clock cycle).

The above approaches address the issue of data non-determinism during a device test, however, there are additional requirements for operational usage (e.g., transferring data from the I/O clock domain 106 to the core clock domain 104 during normal, non-test, operations) so that the microprocessor 100 can be used at an optimum speed.

As described above, microprocessors include multiple clock domains and each domain can have a different clock frequency or same frequency but different phase. By way of example, an I/O clock domain 106 can have a clock cycle of about 150 MHz to about 1 GHz used for communication between the microprocessor and the peripheral devices. Another clock domain can be the CPU core clock domain 104 that can have a clock frequency of between about 900 MHz to about 4 GHz or more (e.g., 2.3 GHz).

The microprocessor 102 must communicate data from one domain to another so that the data can be processed. By way of example, data must be transferred from the I/O clock domain 106 to the core clock domain 104 so that the CPU core 110 can process the data. Similarly, the results of the processed data should be communicated back to the I/O clock domain 106 so that the results can be output from the microprocessor 102.

One embodiment provides a clock crossing FIFO (first in first out) logic 112 between the CPU clock domain 104 and the I/O clock domain 106. The clock crossing FIFO logic 112 provides an independent clock domain crossing. The independent clock domain crossing can include an arbitrary phase or frequency relationship between the clock domains 104, 106. The clock crossing FIFO logic 112 can include one or more read and write buffer pointers to pass data between the core clock domain 104 and the I/O clock domain 106.

Figure 6:
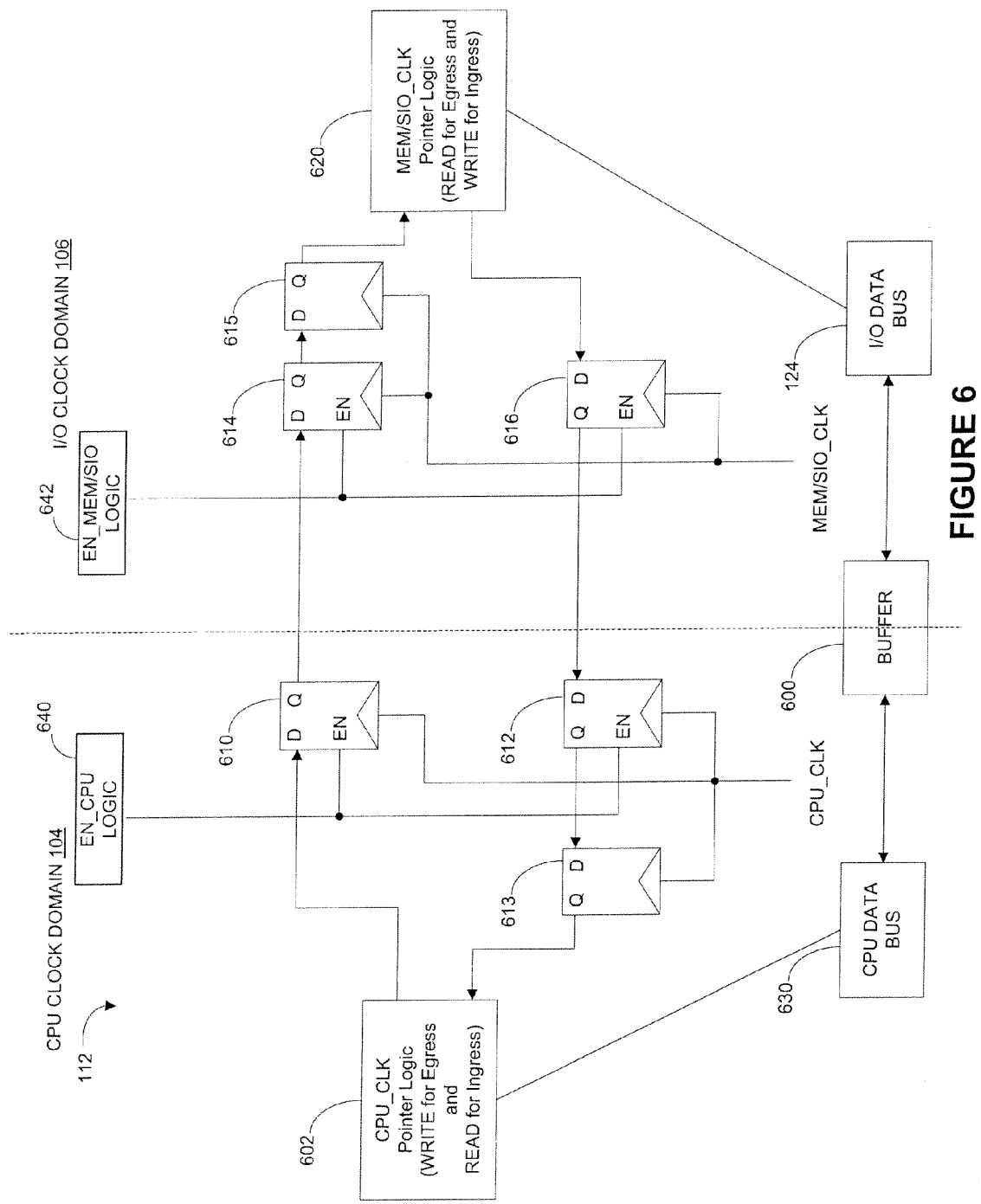
FIG. 6 is a block diagram of the clock crossing FIFO logic, in accordance with an embodiment of the present invention.

FIG. 6 is a block diagram of the clock crossing FIFO logic 112, in accordance with an embodiment of the present invention. The clock crossing FIFO logic 112 can transfer data between the two independent clock domains. The independent clock domain crossing can include an arbitrary phase or frequency relationship between the clock domains 104, 106. The clock crossing FIFO logic 112 includes a CPU_CLK (CPU clock) pointer logic 602 and a MEM/SIO_CLK (I/O clock) pointer logic 620. The clock crossing FIFO logic 112 also includes flip-flops 610, 614 and 615 for communicating pointer status from the CPU clock domain 104 to the I/O clock domain The clock crossing FIFO logic 112 also includes flip-flops 616, 612 and 613 for communicating pointer status from the I/O clock domain 106 to the CPU clock domain 104.

A buffer 600 is coupled to the data bus 124 in the I/O clock domain 106 and the data bus 630 in the CPU clock domain 104. The buffer 600 holds the data being transferred between the I/O clock domain 106 and the CPU clock domain 104, in either direction.

Figure 7:
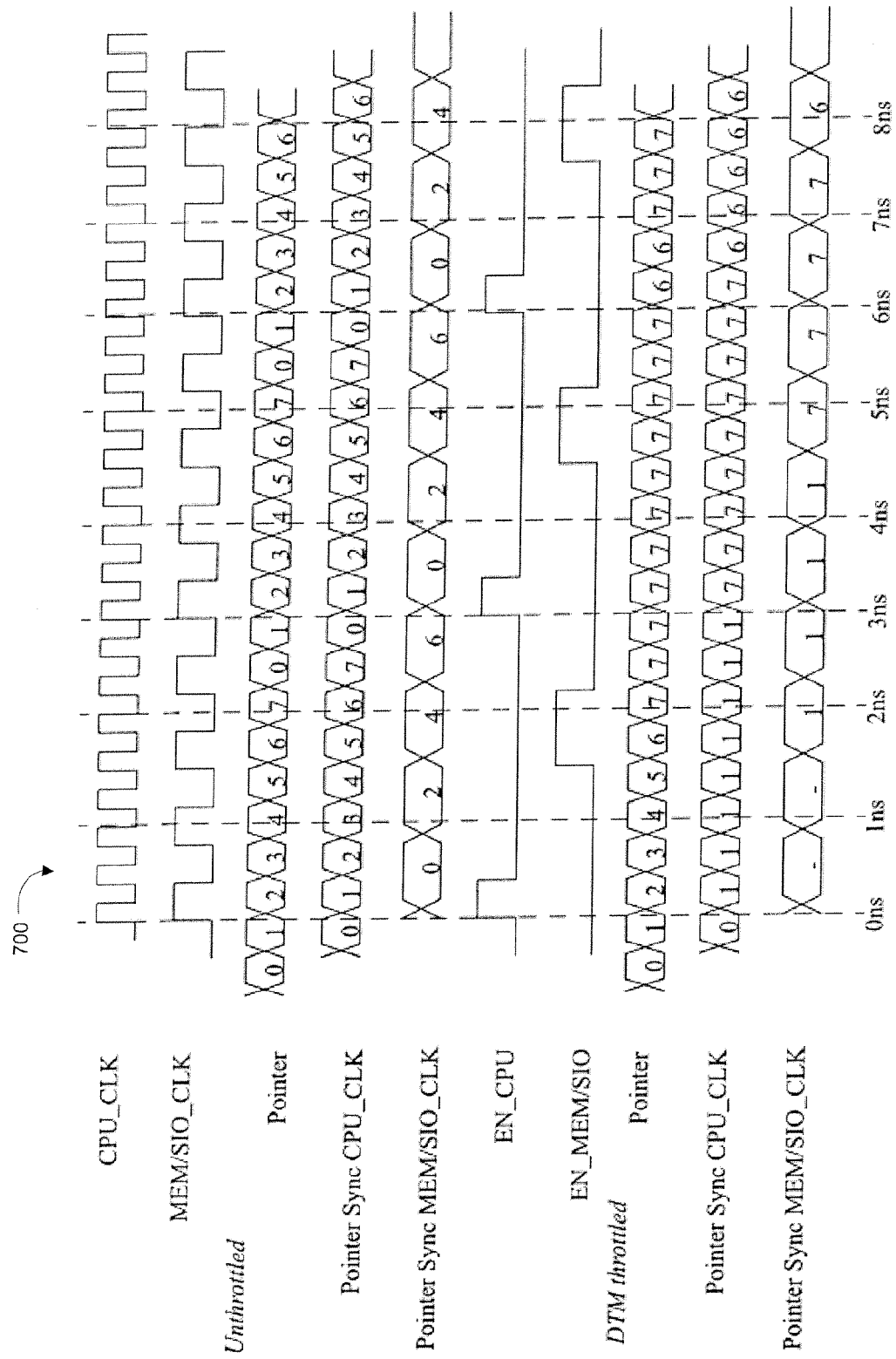
FIG. 7 is a timing diagram for the various signals during throttled and unthrottled data transfer, in accordance with an embodiment of the present invention.
Figure 8:
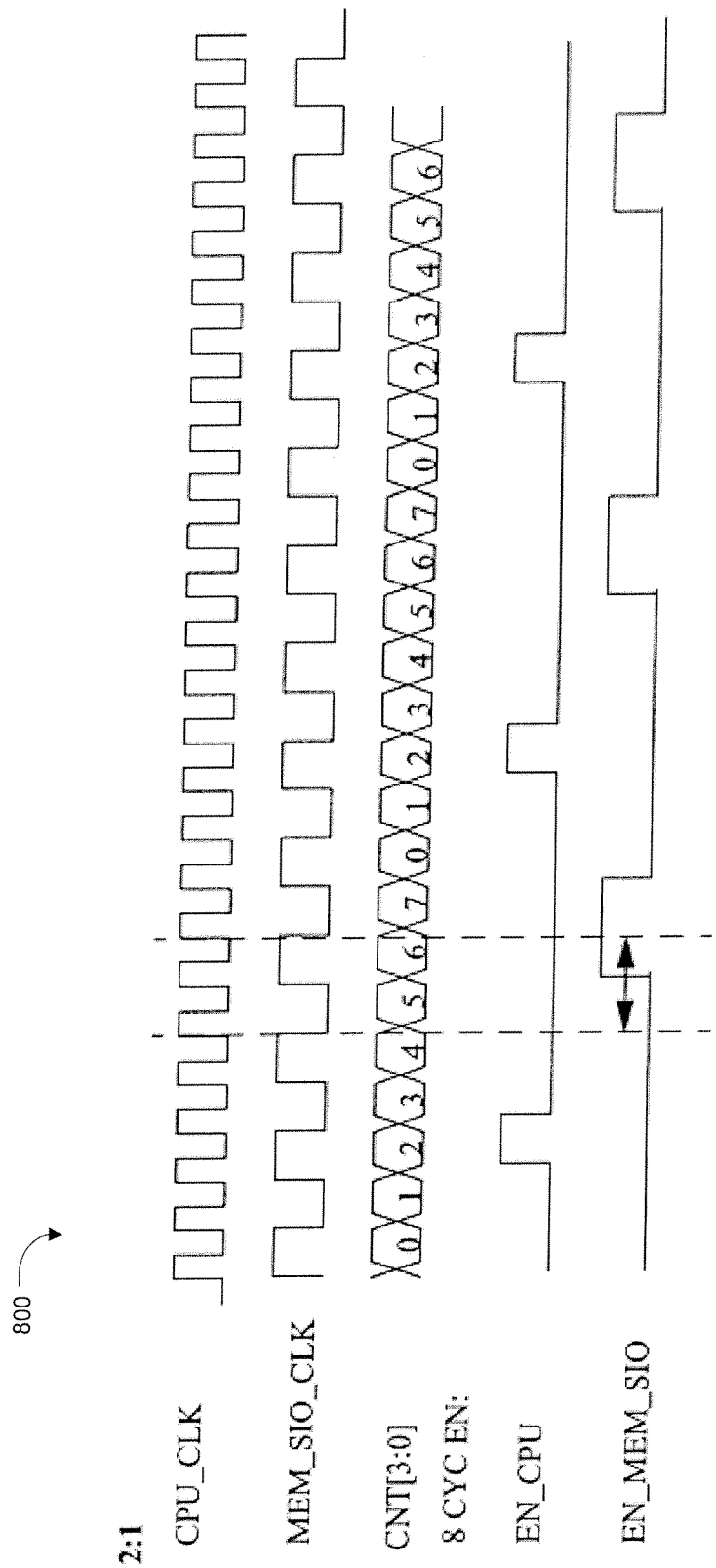
FIG. 8 is a timing diagram for the various signals during a 2:1 clock rate ratio data transfer, in accordance with an embodiment of the present invention.

FIG. 7 is a timing diagram 700 for the various signals during throttled and unthrottled data transfer, in accordance with an embodiment of the present invention. FIG. 8 is a timing diagram 800 for the various signals during a 2:1 clock rate ratio data transfer, in accordance with an embodiment of the present invention. The data transfers between two clock domains can be set to occur in one of four modes. The ratio of the CPU_CLK to IO_CLK can be set to either 1:1 or 2:1 clock ratio. In a 1:1 clock ratio data from IO to CPU is transferred every IO_CLK cycle, and data from CPU to IO is transferred every CPU_CLK cycle. In a 2:1 clock ratio data from IO to CPU is transferred every IO_CLK cycle, and data from CPU to IO is transferred every second CPU_CLK cycle. An enable signal is used to select either every data transfer or every eighth data transfer. In an unthrottled mode data transfers occur for every possible transfer in either 1:1 or 2:1 mode. In a throttled mode data transfers occur for every eighth possible transfer in either 1:1 or 2:1 mode.

Figure 9:
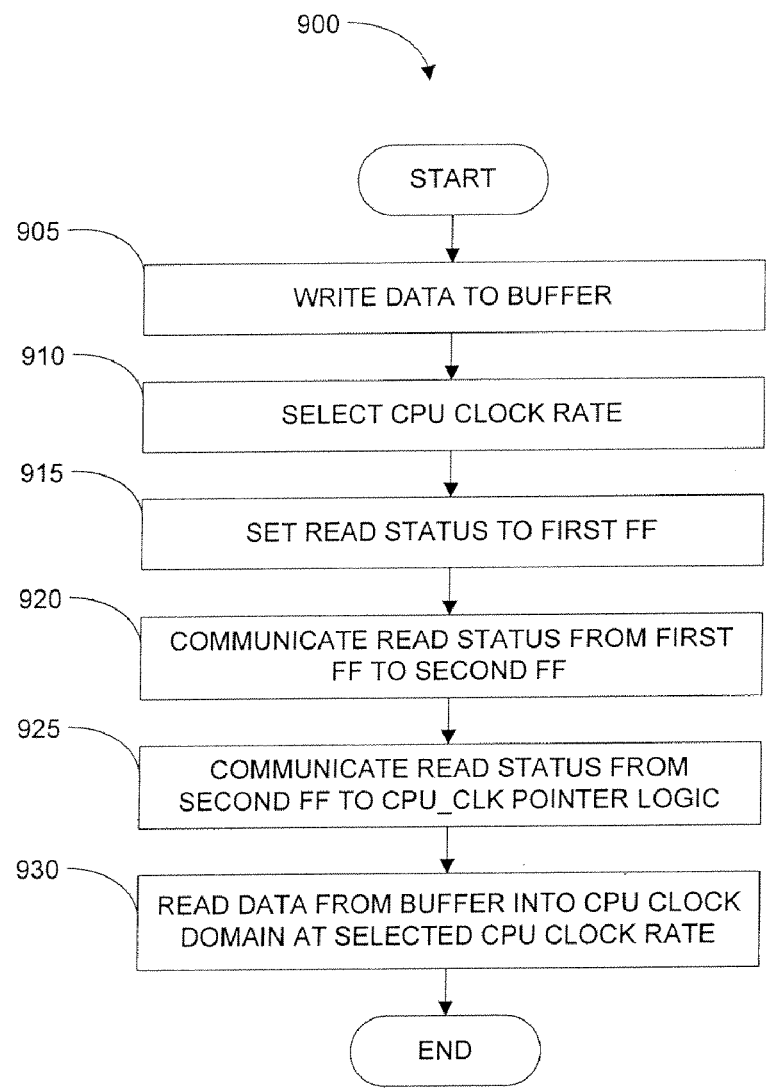
FIG. 9 is a flowchart of the method operations for a data transfer from the I/O clock domain to the core/CPU clock domain, in accordance with an embodiment of the present invention.

FIG. 9 is a flowchart of the method operations 900 for a data transfer from the I/O clock domain 106 to the core CPU clock domain 104, in accordance with an embodiment of the present invention. In an operation 905, the I/O_CLK pointer logic 620 causes data to be written in the buffer 600.

In an operation 910, a desired CPU clock rate is selected. The CPU clock rate can be unthrottled so as to be allowed to operate at a maximum CPU clock rate and thereby stress and test the CPU core (as shown in FIG. 7). The CPU clock rate can be locked or throttled to the I/O clock rate (as shown in FIG. 7). Alternatively, the CPU clock rate can be locked to a selected integer ratio (e.g., 2:1, 3:1, etc.) of the I/O clock rate (as shown in FIG. 8).

In an operation 915, the I/O_CLK pointer logic 620 sends a pointer status to the flip flop (FF) 616 to indicate that data has been placed in the buffer 600 and is ready to be read by the CPU.

In an operation 920, the EN_MEM/SIO enable signal is applied to the FF 616, and the read pointer status is communicated from FF 616 to FF 612. In an operation 925, the EN_CPU enable signal is applied to the FF 612 and FF 613 and the read pointer status is communicated from FF 612 to the FF 613 and then the CPU_CLK pointer logic 602.

In an operation 930, the CPU_CLK pointer logic 602 initiates a read operation on the buffer 600 and data is transferred from the buffer at the selected CPU clock rate. The CPU continues reading the data from the buffer 600 until the buffer is empty and the method operations can end. Alternatively, the I/O_CLK pointer logic 620 can communicate a stop read status to the CPU_CLK pointer logic 602 as described above in operations 915-925.

Figure 10:
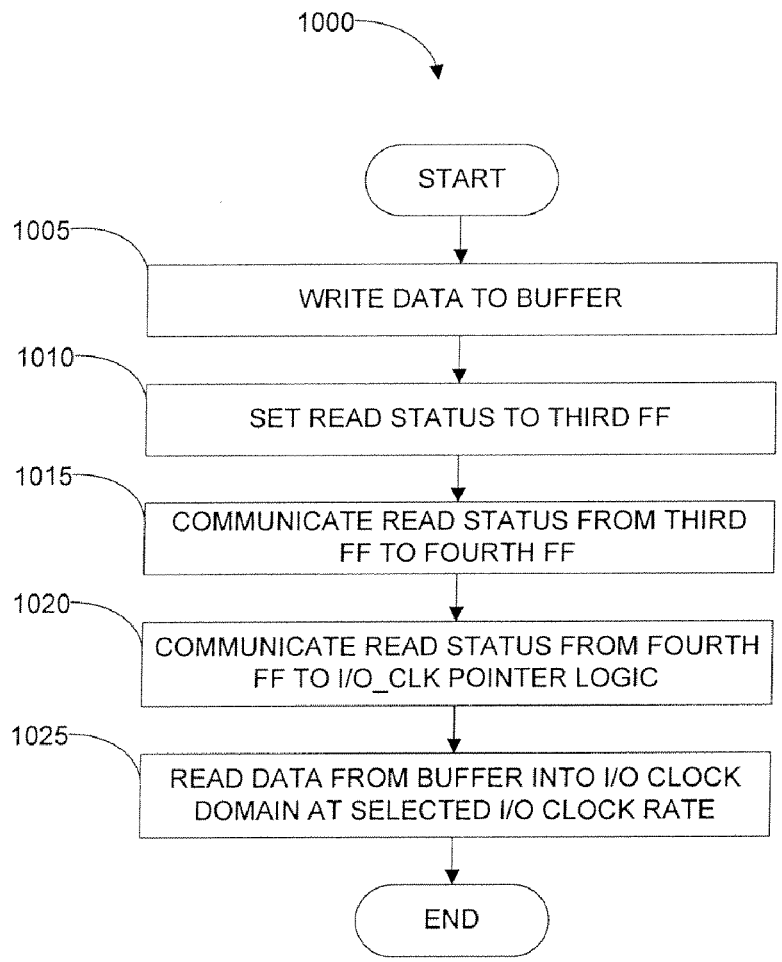
FIG. 10 is a flowchart of the method operations for a data transfer from the core/CPU clock domain to the I/O clock domain, in accordance with an embodiment of the present invention.

FIG. 10 is a flowchart of the method operations 1000 for a data transfer from the core CPU clock domain to the 104 I/O clock domain 106, in accordance with an embodiment of the present invention. In an operation 1005, the CPU_CLK pointer logic 602 causes data to be written in the buffer 600.

In an operation 1010, the CPU_CLK pointer logic 602 sends a pointer status to the FF 610 to indicate that data has been placed in the buffer 600 and is ready to be read by the I/O.

In an operation 1015, the EN_CPU enable signal is applied to the FF 610, and the read pointer status is communicated from FF 610 to FF 614. In an operation 1020, the EN_MEM/SIO enable signal is applied to the FF 614 and FF 615 and the read pointer status is communicated from FF 614 to the FF 615 and to the I/O_CLK pointer logic 620.

In an operation 1025, the I/O_CLK pointer logic 620 initiates a read operation on the buffer 600 and data is transferred from the buffer at the I/O clock rate.

It should be understood that while flip flop circuits 610-616 are described herein that one skilled in the art could use any type of logic circuit to transfer the read status are described above. For example, buffers or registers or other data storage (e.g., memory circuit) could be used.

Reading continues from one domain until the buffer 600 is empty or indicated to be empty based upon the logic in the reading domain. Similarly, in a write operation, writing will continue to one domain 104 or 106 until the buffer 600 is full or indicated to be full based upon the logic in the writing domain.

Figure 11:
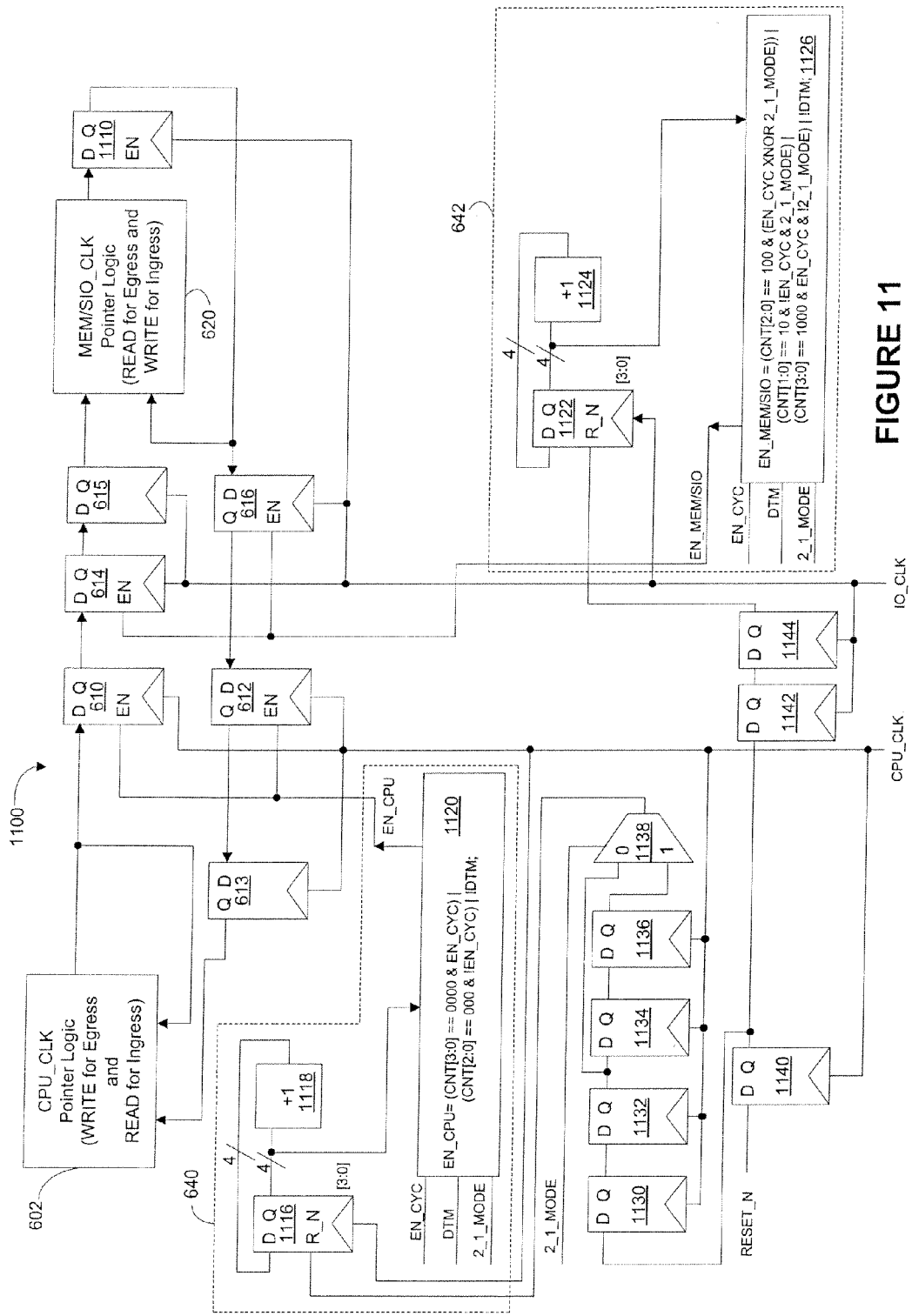
FIG. 11 is a block diagram of a clock crossing FIFO logic, in accordance with an embodiment of the present invention.

FIG. 11 is a block diagram of a clock crossing FIFO logic 1100 for asserting the EN_CPU signal, in accordance with an embodiment of the present invention. The clock crossing FIFO logic 1100 is a more detailed schematic of one embodiment of the clock crossing FIFO logic 600 shown in FIG. 6 above. The EN_CPU logic 640 generates the EN_CPU signal. The EN_CPU logic 640 includes flip flops 1116 and incrementer 1118 (i.e., logic to add 1) and logic 1120. Logic 640 generates a regular pulse. The pulse frequency (i.e., the number of clocks before the signal goes high) is determined by a control signal to indicate the number of clocks before the signal goes high. By way of example, the pulse frequency can be 8 and 16 clocks. The incrementer 1118 and flip flop 1116 provide a counter functionality that logic 1120 uses to determine when to assert the EN_CPU signal.

The EN_MEM/SIO logic 642 generates the EN_MEM/SIO signal. The EN_MEM/SIO logic 642 includes flip flops 1122 and 1124 and logic 1126. Logic 642 is substantially similar to logic 640. Logic 642 includes a counter that includes flip flop 1122 and incrementer 1124. The logic 1126 asserts the EN_MEM/SIO signal based upon the counter as well as control signals to indicate the number of clocks as well as the clock ratio. By way of example, the pulse frequency can be 8 and 16 clocks when the clock ratio is 1:1. If the clock ratio is set to 2:1 (CPU_CLK: IOCLK), then the EN_MEM/SIO signal is asserted every 4 and 8 clocks (i.e., in 2:1 mode, CPU_CLK runs at twice the rate as IOCLK). The EN_CPU and EN_MEM/SIO can be set to switch at the same rate by asserting the EN_CPU every 8th or 16th clock (in 8-cycle or 16-cycle mode), while EN_MEM/SIO is asserted every 4th or 8th IO_CLK (in 8-cycle or 16-cycle mode). Additionally, logic 1126 can also allow deterministically passing data back and forth between CPU_CLK and IO_CLK domains, when the EN_CPU and EN_MEM/SIO are 180 degrees out of phase such that they are asserted at the same rate, but at different times as shown in FIG. 8.

There are two functions being carried out by flip flops 1140, 1142, 1144, 1130, 1132, 1134, 1136, and multiplexer 1138. The first function is to deliver the RESET_N signal that is used to start the data transfers between the CPU_CLK and IO_CLK clock domains. The IO_CLK domain transfers are enabled one CPU_CLK+two IO_CLK cycles after the RESET_N signal is received. The CPU_CLK domain transfers are enabled either three or five CPU_CLK after the RESET_N signal is received, for CPU_CLK to IO_CLK ratios of 1:1 and 2:1 respectively. The RESET_N signal is delivered to two different clock domains such that flip flops 1116 and 1122 receive this signal substantially simultaneously. The second function that these flip flops carry out is to align or synchronize the RESET_N signal into the clock domain where it is used. The synchronization function is described in more detail below.

Flip flops 1140, 1142, 1144, 1130, 1132, 1134 and 1136 allow the RESET_N signal to be deterministically passed from CPU_CLK domain to IO_CLK domain such that the RESET_N arrives at flip flops 1116 and 1122 in the same number of CPU_CLK cycles, regardless of the clock ratios. By way of example, with a clock ratio of 1:1, the path from the output of flip flop 1140 to 1116 is selected to contain two flip flops, 1130 and 1132, delaying the delivery of the RESET_N signal to flip flop 1116 by two CPU_CLK cycles after flip flop 1140. The path from the output of flip flop 1140 to 1122 contains 2 flip flops, and with the IO_CLK and CPU_CLK being substantially identical, thus delivery of the RESET_N signal to flip flop 1122 is also delayed by two CPU_CLK cycles. With a clock ratio of 2:1, where IO_CLK is derived from the CPU_CLK divided by 2, the RESET_N signal is delivered to flip flop 1116 four CPU_CLK cycles after flip flop 1140. The RESET_N signal is delivered to flip flop 1122 two IO_CLK cycles after flip flop 1140, which is also exactly four CPU_CLK cycles.

As a result, the counters can reset at the same time and thereby guarantee that the EN_CPU and EN_MEM/SIO are asserted in phase. Flip flops 1142 and 1144 are staging flops to drive to the IO_CLK logic. Flip flops 1142 and 1144 capture the RESET_N signal in the IO_CLK frequency domain where the RESET_N signal is distributed to the IO_CLK logic. Flip flops 1130,1132,1134,1136 are staging flops to drive to the CPU_CLK logic. Multiplexer 1138 selects the RESET_N signal such that depending upon the clock ratio (i.e., 2:1 or 1:1) the RESET_N signal will arrive at flip flop 1116 delayed by the number of CPU_CLK cycles that is equivalent to the delay of delivering the RESET_N signal to flip flop 1122 with the IO_CLK. In one implementation, with a 1:1 clock ratio (i.e., wherein the IO_CLK frequency is the same as CPU_CLK frequency), the RESET_N signal arrives flip flop 1122, which is in the IO_CLK domain, delayed by two IO_CLK cycles from the output of flip flop 1140, while arriving at flip flop 1116, which is still in the CPU_CLK domain, delayed by two CPU_CLK cycles from the output of flip flop 1140. Alternatively, with a 2:1 clock ratio (i.e., where CPU_CLK is 2× of IO_CLK frequency), the RESET_N signal arrives at IO_CLK flop 1122 on the third IO_CLK after being driven from flip flop 1140, while arriving at CPU_CLK 1116 at the 6th CPU_CLK (CPU_CLK running 2× of IO_CLK) after flip flop 1140.

The precise number of flip flips 1134 and 1136 is dependant on the ratio between the CPU_CLK and IO_CLK. By way of example, there are two flip flops 1142 and 1144 in the path from the output of flip flop 1140 to the R_N input of flip flop 1120. To accommodate the 1:1 and 2:1 frequency modes multiplexer 1138 is used to select either two or four flip flops, respectively, to be placed in the path from the output of flip flop 1140 to the R_N input of flip flop 1116. If a CPU_CLK to IO_CLK frequency ratio of 4:1 is required, then the multiplexer 1138 would select between either two or eight flip flops to be placed in the path from the output of flip flop 1140 to the R_N input of flip flop 1116. The exact number of flip flops to place in each path also depends upon the phase relationship between IO_CLK and CPU_CLK. The descriptions here relate to the phases indicated in FIGS. 7 and 8. Even with the same frequency ratios, other phases are valid but will require 'tuning' the delays in these two paths accordingly.

As mentioned above, another function of flip flops 1140, 1142, 1144, 1130, 1132, 1134, 1136 is to synchronize the RESET_N signal into the clock domain where it is used. The RESET_N signal, generated by the ATE, is delivered to multiple widely separated locations over the chip. The RESET_N signal is not usually delivered via a chain of flip flops, instead amplifiers are distributed along these wires to maintain clean rise and fall transitions. Thus, the RESET_N signal has some arbitrary phase relationship to CPU_CLK when it is received at flip flop 1140. There is some chance that the RESET_N signal will arrive at flip flop 1140 at about the same time as the sampling edge of the CPU_CLK, which could result in a longer than usual clock to Q delay, perhaps as long as a CPU_CLK cycle. Because the RESET_N signal is forked to two destinations, such increased clock to Q delay could result in non-deterministic behavior, and the delivery of the RESET_N signal to one or the other of flip flops 1116 and 1122 could be delayed by one clock cycle. By cascading multiple flip flops in each of these paths, the probability of such non-deterministic behavior is made extremely low.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of deterministically transferring data across a first clock domain to a second clock domain comprising:

receiving a resynchronize command in the first clock domain;

initiating a corresponding one of a plurality of read delays in each one of a second plurality of devices in the second clock domain, wherein each one of the second plurality of devices are coupled a corresponding one of a first plurality of devices in the first clock domain by a corresponding one of a plurality of serial data lanes;

counting down the plurality of read delays to zero;

receiving a training pattern across the plurality of serial data lanes to each one of the second plurality of devices after the plurality of read delays count down to zero;

recovering a clock data in each of the second plurality of devices including locking a PLL circuit in each one of the second plurality of devices to a corresponding PLL circuit in the corresponding one of the first plurality of devices;

receiving a synch byte across the plurality of serial data lanes to each one of the second plurality of devices;

selecting one of the plurality of serial lanes as a reference lane;

wherein the plurality of serial lanes couple the first clock domain to the second clock domain;

initiating a write pointer;

writing n bytes of serial data to a buffer; and converting the n bytes of data from serial data to parallel data in a serial to parallel converter such that the serial n byte data in the buffer are aligned in time.

2. The method of claim 1, wherein the resynchronize command is initiated by a source within a CPU that includes at least one of the first clock domain and the second clock domain.

3. The method of claim 1, wherein the resynchronize command is initiated by an arbitrary counter within a CPU that includes at least one of the first clock domain and the second clock domain.

4. The method of claim 1, wherein the resynchronize command is an automatic periodic event.

5. The method of claim 4, wherein the resynchronize command is issued every selected number of cycles of a reference signal.

6. The method of claim 1, wherein a duration of one of the plurality of read delays corresponds to a distance between a corresponding device and a CPU core including the second plurality of devices.

7. The method of claim 1, wherein a duration of one of the plurality of read delays corresponds to an actual delay in a data received from a transmitting device.

8. The method of claim 1, wherein a duration of one of the plurality of read delays is a first selected number of cycles between when the resynchronize command is received in each receiving device and when the data bit is received in a slowest lane.

9. The method of claim 1, wherein a duration of one of the plurality of read delays is limited to less than or equal to a second selected number of cycles after the resynchronize command is received in each receiving device.

10. The method of claim 1, wherein each one of the training bytes in the training pattern includes a corresponding one of a plurality of pre-selected values.

11. The method of claim 10, wherein each one of the plurality of pre-selected values has a different pre-selected value.

12. The method of claim 10, wherein each one of the plurality of pre-selected values has a same pre-selected value.

13. The method of claim 1, wherein the synch byte includes a corresponding pre-selected value.

14. The method of claim 1, wherein each of the second plurality of devices includes a receiver corresponding to a transmitter in each one of the second plurality of devices.

15. A system for deterministically transferring data across from a first clock domain to a second clock domain comprising:
a computer including:
computer readable code on a non-transitory computer readable media for receiving a resynchronize command in the first clock domain wherein the resynchronize command is an automatic periodic event;
computer readable code on a non-transitory computer readable media for initiating a corresponding one of a plurality of read delays in each one of a second plurality of devices in the second clock domain, wherein each one of the second plurality of devices are coupled a corresponding one of a first plurality of devices in the first clock domain by a corresponding one of a plurality of serial data lanes;
computer readable code on a non-transitory computer readable media for counting down the plurality of read delays to zero;
computer readable code on a non-transitory computer readable media for receiving a training pattern across the plurality of serial data lanes to each one of the second plurality of devices after plurality of read delays count down to zero wherein each one of a plurality of training bytes in the training pattern includes a corresponding one of a plurality of pre-selected values;
computer readable code on a non-transitory computer readable media for recovering a clock data in each of the second plurality of devices including locking a PLL circuit in each one of the second plurality of devices to a corresponding PLL circuit in the corresponding one of the first plurality of devices;
computer readable code on a non-transitory computer readable media for receiving a synch byte across the plurality of serial data lanes to each one of the second plurality of devices wherein the synch byte includes a corresponding pre-selected value;
computer readable code on a non-transitory computer readable media for selecting one of the plurality of serial lanes as a reference lane; wherein the plurality of serial lanes couple the first clock domain to a second clock domain;
computer readable code on a non-transitory computer readable media for initiating a write pointer;
computer readable code on a non-transitory computer readable media for writing n bytes of serial data to a buffer; and
computer readable code on a non-transitory computer readable media for converting the n bytes of data from serial data to parallel data in a serial to parallel converter such that the serial n byte data in the buffer are aligned in time.

16. A microprocessor simulation in an automated test bench comprising:
a first clock domain;
a second clock domain the first clock domain including a first plurality of logic devices for communicating a read status from the first clock domain to the second clock domain;
logic for receiving a resynchronize command in the first clock domain;
logic for initiating a corresponding one of a plurality of read delays in each one of a second plurality of logic devices in the second clock domain, wherein each one of the second plurality of devices are coupled a corresponding one of a first plurality of devices in the first clock domain by a corresponding one of a plurality of serial data lanes;
logic for counting down the plurality of read delays to zero;
logic for receiving a training pattern across the plurality of serial data lanes to each one of the second plurality of devices after plurality of read delays count down to zero;
logic for recovering a clock data in each of the second plurality of logic devices including locking a PLL circuit in each one of the second plurality of devices to a corresponding PLL circuit in the corresponding one of the first plurality of devices;
logic for receiving a synch byte across the plurality of serial data lanes to each one of the second plurality of logic devices;
logic for selecting one of the plurality of serial lanes as a reference lane; wherein the plurality of serial lanes couple the first clock domain to a second clock domain;
logic for initiating a write pointer;
logic for writing n bytes of serial data to a buffer; and
logic for converting the n bytes of data from serial data to parallel data in a serial to parallel converter such that the serial n byte data in the buffer are aligned in time.

* * * * *